(12) United States Patent
Büttner et al.

(10) Patent No.: US 7,069,953 B2
(45) Date of Patent: Jul. 4, 2006

(54) PLASTIC CORRUGATION CORRUGATED PIPE WITH MONOLITHIC CONTAINER

(75) Inventors: Matthias Büttner, Königsberg (DE); Manfred Krauss, Hettstadt (DE); Rainer Käb, Königsberg (DE)

(73) Assignee: Frankische Rohrwerke Gebr. Kirchner GmbH & Co. KG (DE)

( * ) Notice: Subject to any disclaimer, the term of this patent is extended or adjusted under 35 U.S.C. 154(b) by 176 days.

(21) Appl. No.: 10/216,485

(22) Filed: Aug. 9, 2002

(65) Prior Publication Data

US 2003/0051763 A1 Mar. 20, 2003

(30) Foreign Application Priority Data

Aug. 14, 2001 (DE) ..................... 201 13 499 U (51) Int. Cl.
*F16L 11/11* (2006.01)

(52) U.S. Cl. .................. 138/121; 138/177; 138/109; 138/178; 222/529

(58) Field of Classification Search ................. 138/121, 138/122, 178, 177, DIG. 10, 109; 222/529, 222/530
See application file for complete search history.

(56) References Cited

U.S. PATENT DOCUMENTS

| | | | | |
|---|---|---|---|---|
| 3,076,669 A | * | 2/1963 | Schlein | 285/179 |
| 3,234,969 A | | 2/1966 | du Mont | 138/121 |
| D206,236 S | * | 11/1966 | Seckel | D23/266 |
| 3,838,713 A | * | 10/1974 | Tubbs | 138/109 |
| 3,847,184 A | * | 11/1974 | God | 138/120 |
| 4,236,655 A | * | 12/1980 | Humphries | 222/465.1 |
| 4,243,162 A | * | 1/1981 | Klygis | 222/530 |
| 4,351,454 A | * | 9/1982 | Maynard, Jr. | 222/143 |
| 4,360,104 A | * | 11/1982 | Lang | 206/527 |
| 4,492,324 A | | 1/1985 | Weber | 222/529 |
| 4,856,664 A | * | 8/1989 | Gillispie et al. | 222/572 |
| 4,927,191 A | | 5/1990 | Mikol | 285/226 |
| 5,133,481 A | * | 7/1992 | Mayfield | 222/466 |
| 5,503,308 A | * | 4/1996 | Young et al. | 222/529 |
| 5,882,048 A | | 3/1999 | Kawasaki et al. | 285/319 |
| 5,915,735 A | * | 6/1999 | Noble | 285/4 |
| 5,934,522 A | * | 8/1999 | Canela et al. | 222/527 |
| 6,021,816 A | * | 2/2000 | Jeltsch et al. | 138/121 |
| 6,041,825 A | | 3/2000 | Smith et al. | 138/109 |
| 6,223,777 B1 | * | 5/2001 | Smith et al. | 138/109 |

FOREIGN PATENT DOCUMENTS

| | | |
|---|---|---|
| DE | 195 31 245 A1 | 2/1997 |
| DE | 297 21 677 U1 | 4/1998 |
| DE | 29721677 | 4/1998 |
| DE | 197 25 051 A1 | 12/1998 |
| DE | 199 12 351 A1 | 9/2000 |
| FR | 2 576 876 A1 | 8/1986 |

* cited by examiner

*Primary Examiner*—Patrick Brinson
(74) *Attorney, Agent, or Firm*—Raymond A. Nuzzo

(57) ABSTRACT

The invention relates to a plastic corrugation corrugated pipe with corrugation peaks and corrugation valleys for household apparatus or motor vehicles, which pipe has at least one connecting portion and, in accordance with the invention, a container monolithically or integrally molded with the corrugated pipe and having a shape different from the shape of the plastic corrugation corrugated pipe.

21 Claims, 8 Drawing Sheets

PLASTIC CORRUGATION CORRUGATED PIPE WITH MONOLITHIC CONTAINER

FIELD OF THE INVENTION

The invention relates to plastic corrugation corrugated pipes with corrugation peaks and corrugation valleys.

BACKGROUND ART

It is known in the prior art in various fields of application to connect hoses or plastic corrugation corrugated pipes or plastic corrugation corrugated pipes to compensation containers, for instance for the installation of strainers, to strain foreign objects from a flow of liquid, or for the collection of condensation water or the like. Such containers are also connected to corrugated pipes in order to create an intermediate liquid storage. They are also used for the changing of the volume flow at different pipe cross-sections, for example when a liquid is to be accelerated or decelerated. Furthermore, such containers are connected to plastic corrugation corrugated pipes as transition containers or filling containers. Such containers are also useful in the automotive field, for example as storage containers or compensation containers for brake fluid, motor oil or various other liquids, which have to be taken up, for example, because of a temperature expansion, or which simply have to be stored in order to be available when needed.

In all these fields of applications, it is currently necessary to manufacture corresponding containers as injection molded parts and to connect them to corrugated pipes of plastic by way of hose clips, fittings, or the like.

SUMMARY OF THE INVENTION

It is accordingly an object of the invention to overcome the above mentioned disadvantages of the prior art as much as possible. Especially, an object is to be provided which helps to reduce the previous installation cost and the previous multiplicity of parts.

At least one of the mentioned objects is solved in accordance with the invention at least in part by a container monolithically or integrally formed with the corrugated pipe with a shape different from that of the plastic corrugation corrugated pipe.

Plastic corrugation corrugated pipes according to the invention are manufactured by way of a corrugator, in which molding path half molds circulating on endless, circulating molding chains are brought together into a closed molding channel. A thermoplastically deformable plastic tube is guided into the molding channel for the manufacture of a plastic corrugation corrugated pipe, whereby the latter is provided in accordance with the invention with the integral or monolithic container. This means that the container is manufactured in one piece with the plastic pipe by way of a corrugation process.

Preferably, a monolithically or integrally co-molded transition section of plastic is provided between the container and the corrugated pipe, which transitions the corrugated pipe cross-section into the container cross-section. Such a construction guarantees that the container can be transitioned into the corrugated pipe and vice-versa without a loss in wall thickness. However, it must be considered thereby that the corrugation process is run slower during the manufacture of the container, if it has a larger outer diameter, to guarantee an even wall thickness. This means that per unit surface area of the container wall more plastics material is offered for a larger diameter container, than is required for the forming of the corrugated pipe. Of course, the extruder can also be operated with a higher material flow or an additional plastics layer can be regionally offered by coextrusion, in order to offer more material for the corrugation process in the region of the container.

A plastics corrugation corrugated pipe with monolithically or integrally provided container can thereby be provided in accordance with the invention in which no abutment or sealing surfaces occur between the container and the plastic corrugation pipe so that on the one hand material is saved because of the obviated overlap between the corrugated pipe and the container and on the other hand no sealing problems occur. Furthermore, no fastening elements such as pipe clips, flange clips or the like are necessary and sealing elements such as O-rings can also be saved.

The container is preferably at least partially provided with a rigid wall. Depending on the intended use, the container can of course also be at least partially formed as a bellows or corrugated pipe. Depending on whether the container is to be designed as a compensation container with variable volume, the wall or the container can be formed with a rather flexible, which means at least partially bellows type or corrugated pipe type wall.

Accordingly, if, for example, a pressure relief or pressure increase is desired, a constriction can be provided in accordance with the invention in the transition region between the container and the plastic corrugation corrugated pipe. In the interior region, the transition section can also be provided with a sealing surface which can be engaged, for example, by a sealing disk so that the region between the corrugated pipe and the container at the same time can be supplemented by way of a simple plastic valve disk to form a sealing valve.

For certain applications, for example when the container is to be connected to any apparatus portion, the container can be constructed open on one side. In order to thereby guarantee sealing in the region of connection, the container can be provided close to the opening associated therewith with at least one groove shaped structure to receive a sealing device, for example an O-ring.

In order to enable an advantageous fastening of the object of the invention by way of its container to an apparatus, a drain, a water inlet, or the like, fastening portions can be integrally formed into the container. These can also be produced by the corrugation process. For example, locking portions in the form of locking catches or locking lugs, or the like, can be provided.

According to another technique of connection, the container at its open side can also be provided with a union portion or flange portion to allow, for instance the flanging of a drain or the like. For example, such a flange can easily be flanged onto a drain by way of a flange clip, whereby a strainer can be inserted into the container so that components which would clog the conduit are not allowed into the conduit. Because of the increased cross-section in the region of the strainer, a conduit secured in this way has a significantly longer service period before the strainer must be cleaned.

For certain applications, it is preferred to provide a plastic corrugation corrugated pipe to both sides of the container. Here again, no sealant whatsoever is required, since the whole structure can be monolithically or integrally manufactured.

The corrugated pipe on one side of the container can thereby be provided with a different cross-sectional shape and/or wall thickness than on the other side. The most different requirements can be fulfilled in this way and the structure in accordance with the invention can also be used as adapter.

Furthermore, it is possible to provide the container with several sections which have different cross-sections, of different length and have different wall thicknesses. This is advantageous, for example, when restricted space is to be completely used. A storage container or pressure equalization container or the like can here be installed, for example, in a compact engine compartment, with optimal size in such a way that intermediate spaces can be used as much as possible. Correspondingly, the use of space can also be optimized elsewhere, for example, in kitchen appliances, dishwashers, washing machines or the like.

Especially in the case where the object of the invention is used in connection with volatile or diffusive materials, for example fuels for motor vehicles, the wall of the corrugated pipe and/or the container can be made of several layers, possibly with a diffusion blocking layer.

It is further possible to provide a corrugated pipe with several containers of equal or different cross-section or different length. Correspondingly, corrugated pipe sections of equal and/or different cross-section, equal and/or different corrugation shape and/or equal or different wall thickness can be provided between containers in order to achieve an optimization with respect to the purpose of the structure in accordance with the invention. A use, for example, as toner cartridge in copiers can also be considered.

The respective connection regions of the container or the corrugated pipe can also be provided with threaded portions, which are equally integrally or monolithically provided.

BRIEF DESCRIPTION OF THE DRAWINGS

The invention will be further described in the following by way of preferred embodiments, whereby further features, goals and advantages according to the invention are disclosed.

FIG. 2b is a side elevational view of the embodiment shown in FIG. 2a;

FIG. 3a is an end elevational view of another embodiment in accordance with the invention with a flange portion;

FIG. 3b is a side elevational view of the embodiment of FIG. 3a;

FIG. 4b is a side elevational view of the embodiment shown in FIG. 4a;

FIG. 5b is a side elevational view of the embodiment shown in FIG. 5a;

DETAILED DESCRIPTION OF THE PREFERRED EMBODIMENTS

Equal of at least functionally equally components are designated in the FIGS. with the same or corresponding reference numerals.

Figure 1A:
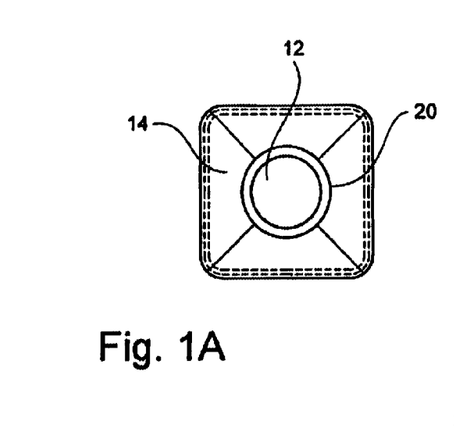
FIG. 1a shows an end view of a preferred embodiment in direction of the container.
Figure 1B:
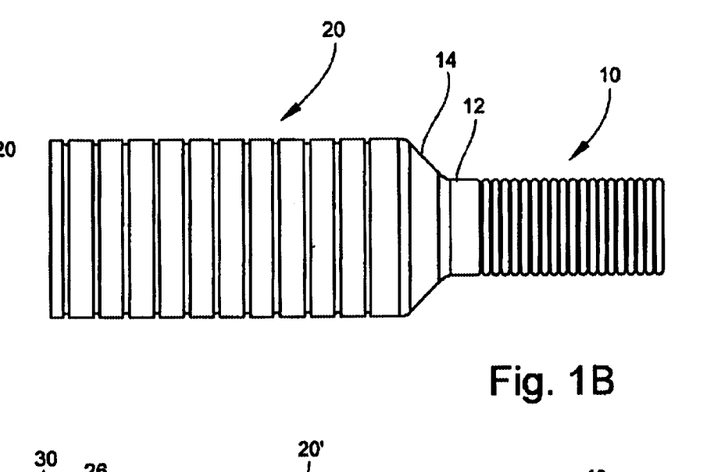
FIG. 1b is a side elevational view of the embodiment shown in FIG. 1.

FIG. 1b shows a side elevational view of an article in accordance with the invention with a corrugated pipe section 10 and a container section 20. A transition section 14 is provided between the corrugated pipe section 10 and the container section 20, which adapts the diameter or cross section of the corrugated pipe 10 to the cross-section or diameter of the container 20. A smooth wall portion 12 is provided between the transition section 14 and the corrugated pipe section 10 which can be used to initiate by process technology the slow running phase of the corrugator during manufacture, which is necessary to manufacture the container 20 with the same wall thickness as, for example, the pipe 10 or with even larger wall thickness than the pipe 10. More material per unit time is offered to the corrugation process in the region of the container than in the region of the plastic corrugation corrugated pipe section 10. In the region of the transition section 14, the speed of the corrugation process can be gradually reduced.

The container 20 can be provided with stabilizing grooves 22. Of course, the container can also be constructed with a completely smooth wall, although a deforming from the molding channel of the corrugator can be carried out more easily with respect to process technology when grooves 22 are incorporated.

The illustration of FIG. 1a shows that the container 20 has an essentially rectangular cross-section, whereby the transition section 14 transitions the rectangular cross-section to the round cross section of the region 12.

Figure 2A:
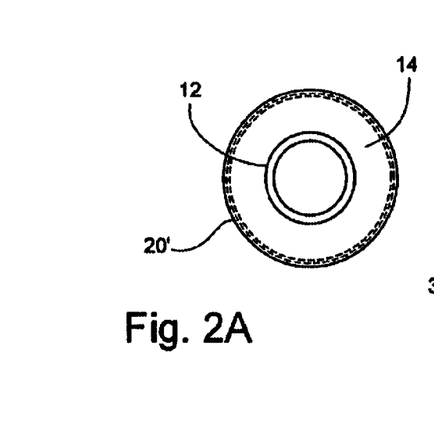
FIG. 2a shows another embodiment in accordance with the invention in end elevational view.
Figure 2B:
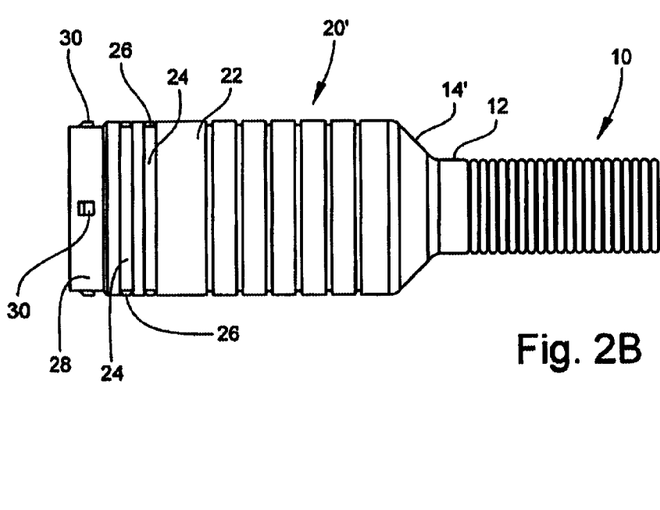
Figures 3A, 3B:
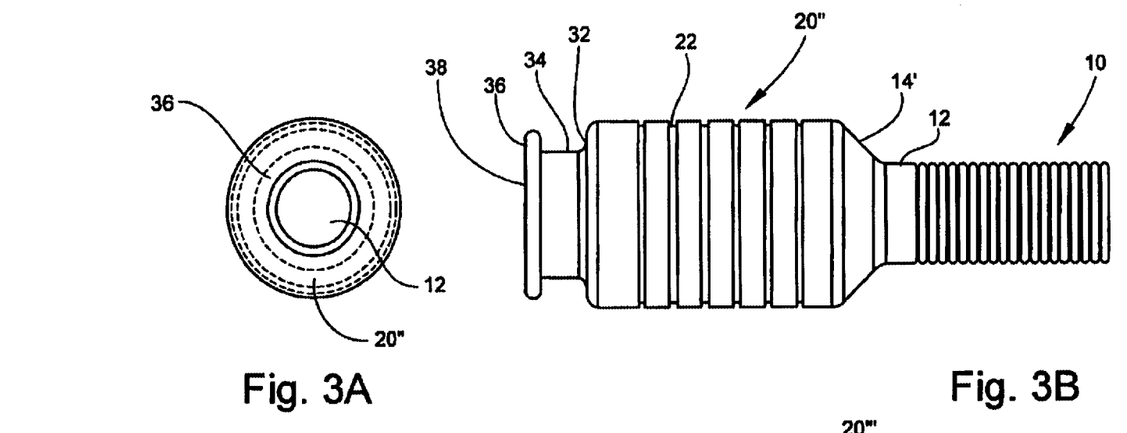

It is apparent from FIG. 2a that the compensation container 20' is here constructed with a round cross-section. Otherwise, the compensation container and the pipe portion 10 are constructed principally in correspondence with the embodiment of FIGS. 1a and 1b. Only in the region of the opening of the container 20', two O-ring grooves 24 are formed in a different manner into which O-rings 26 can be inserted. Furthermore, latching lugs 30 are provided beyond the O-rings in a connection region 28 of the container 20'. Deviating from the embodiment according to FIGS. 1a and 1b, the embodiment according to FIGS. 3a and 3b on the one hand also includes a container 20" with circular cross-section but in addition divergently includes a union section 34 which is followed by a flange section 36. The flange section of course has an opening 38 through which liquid can be filled in or drained. A transition region 32 is here also provided which adapts the diameter or cross-section of the container 20" to the diameter or cross-section of the union section 34.

Figure 4A:
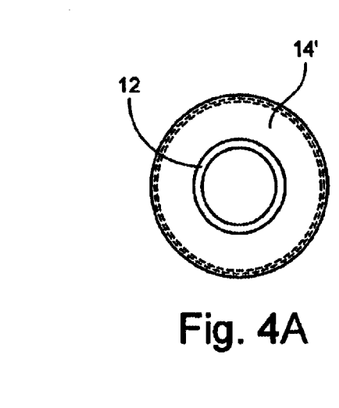
FIG. 4a is a further embodiment in accordance with the invention in end elevational view.
Figure 4B:
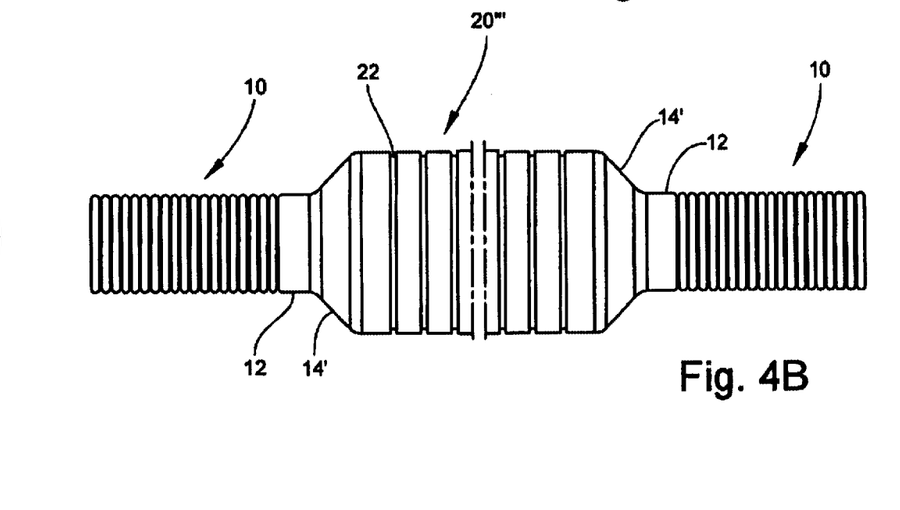
Figure 4C:
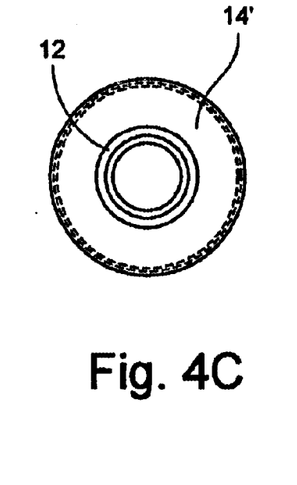
FIG. 4c is another embodiment in accordance with the invention in end elevational view.
Figure 4D:
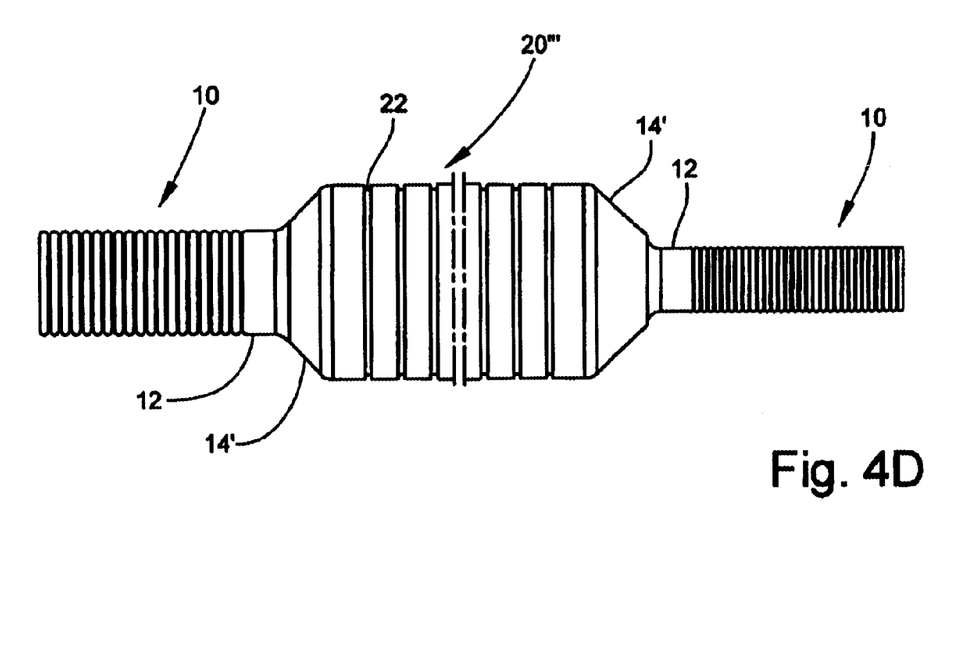
FIG. 4d is a side elevational view of the embodiment shown in FIG. 4c.

The embodiment according to FIGS. 4a and 4b is distinguished from the embodiment according to FIGS. 1a and 1b on the one hand in the round cross-section of the container 20''' and further in that the container 20''' is provided on both ends with transition sections 14', whereby plastic corrugation corrugated pipe sections 10 follow on both sides. The embodiment according to FIGS. 4c and 4d shows on one side of the container a corrugated pipe which differs from the corrugated pipe on the other side of the container in at least one parameter selected from the group of cross-sectional shape, corrugation shape and wall thickness.

Figure 4E:
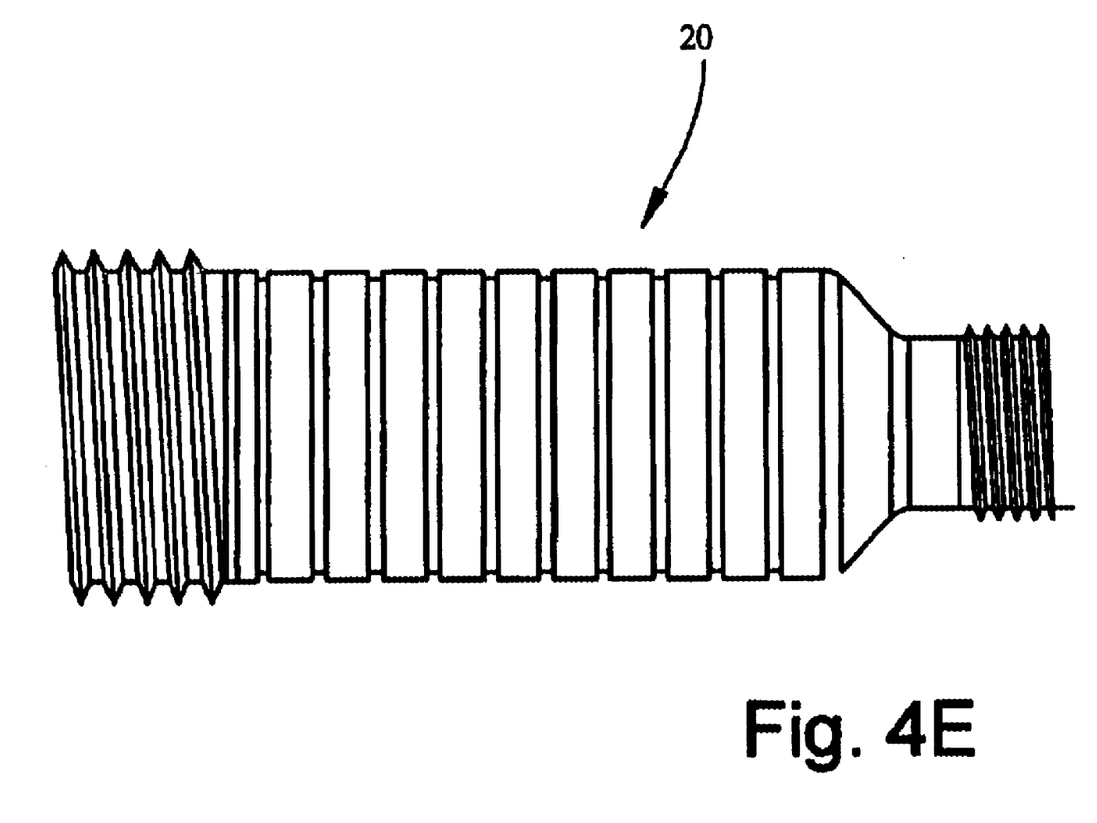
FIG. 4e is a further embodiment in accordance with the invention in end elevational view.

FIG. 4e shows a further embodiment, wherein at least one of the container and the corrugated pipe section includes a threaded connecting section.

Figure 5A:
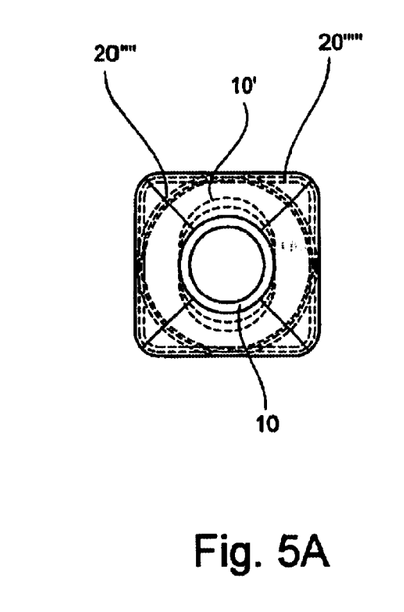
FIG. 5a is an end elevational view of yet another embodiment in accordance with the invention.
Figure 5B:
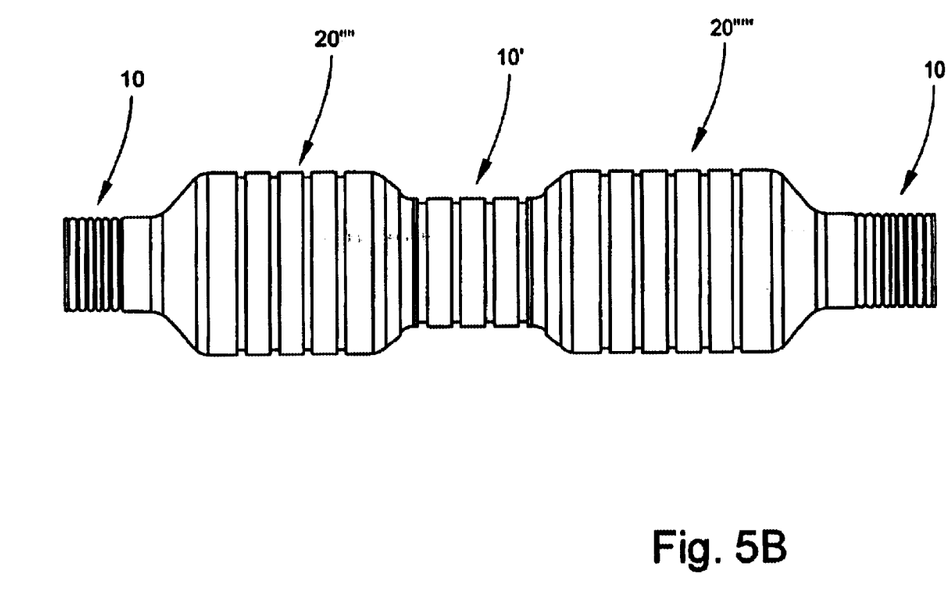

FIGS. 5a and 5b illustrate a structure with the features according to the invention which include several corrugated pipe sections 10, 10'. Furthermore, several container sections 20"", 20"" are provided. As is apparent from FIG. 5a, the container 20"" has a round or circular cross-section. The container 20"" has an essentially rectangular cross-sectional shape. The connecting pipe between the two containers 20"" and 20""', which is identified by reference numeral 10' has an oval cross-section. The two plastic corrugation corrugated pipes 10 on this side and the other side of the container arrangement are respectively constructed with a round cross-section. Of course, the different cross-sections and diameters of the components of this structure are again adapted and connected to one another by transition sections not further referenced here.

Figure 5C:
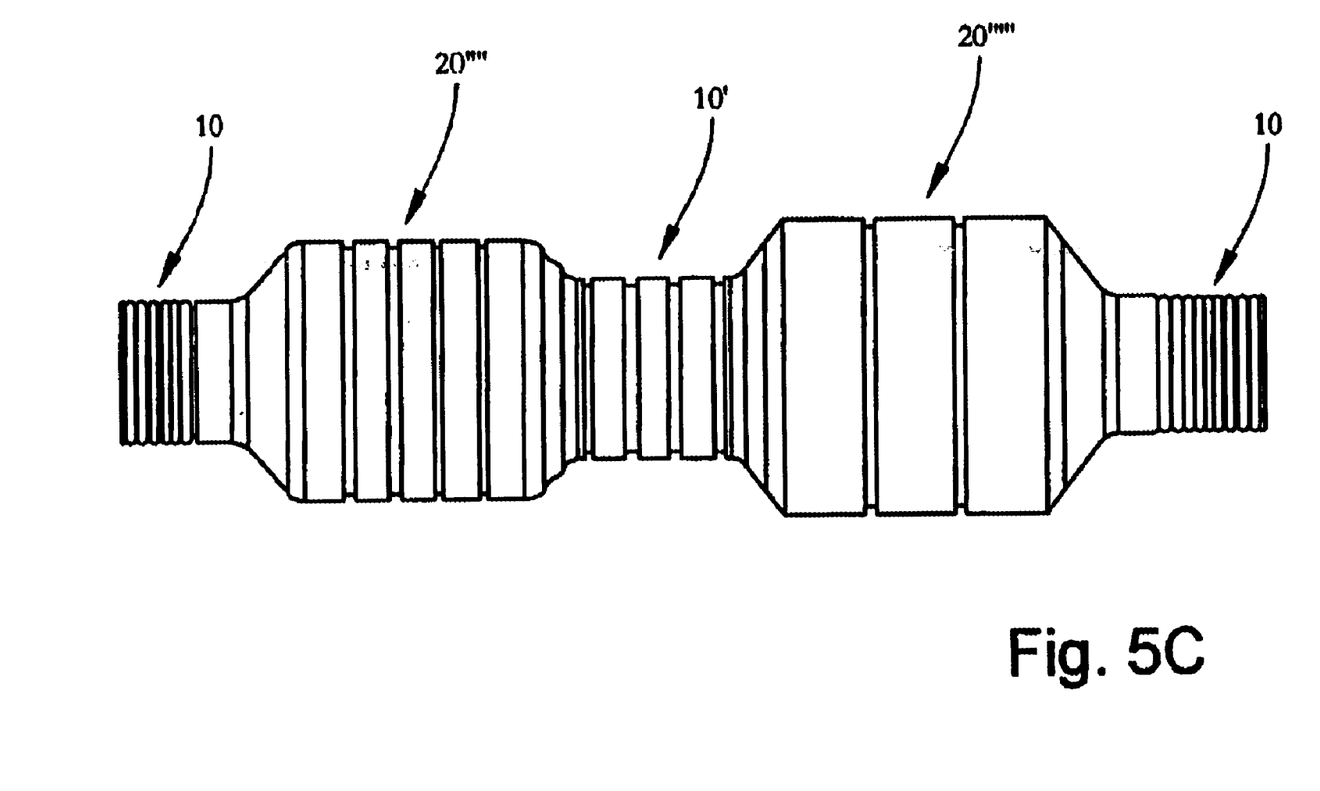
FIG. 5c is a side elevational view of yet another embodiment in accordance with the invention.

FIG. 5c illustrates another embodiment with the features according to the invention, wherein the containers differ in at least one parameter selected from the group of cross-sectional shape, length and wall thickness.

Figure 5D:
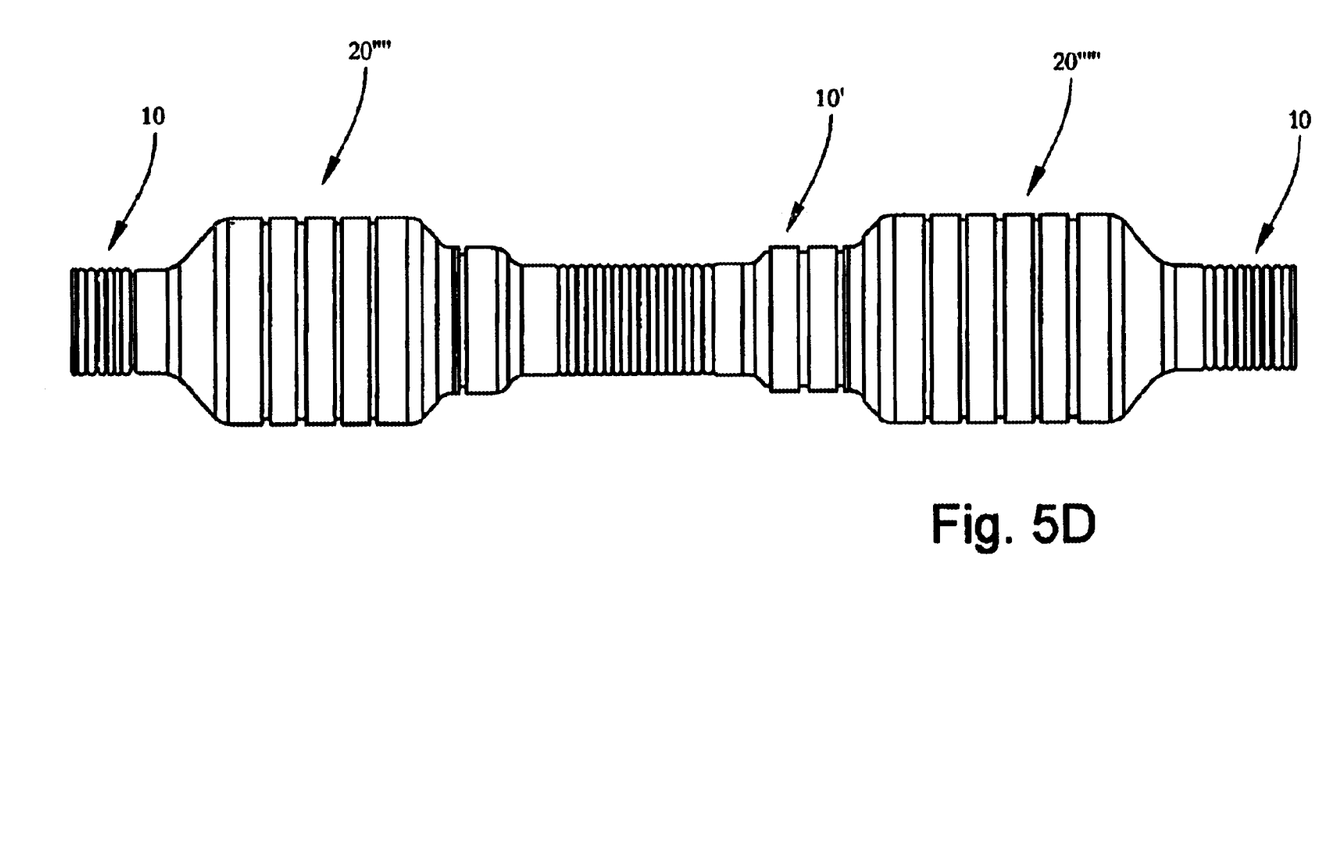
FIG. 5d is a side elevational view of yet another embodiment in accordance with the invention.

FIG. 5d illustrates yet another embodiment with the features according to the invention, wherein between the containers corrugated pipe regions are provided which are the same or differ from one another in at least one parameter selected from the group of cross-sectional shape, corrugation shape and wall thickness.

Figure 5E:
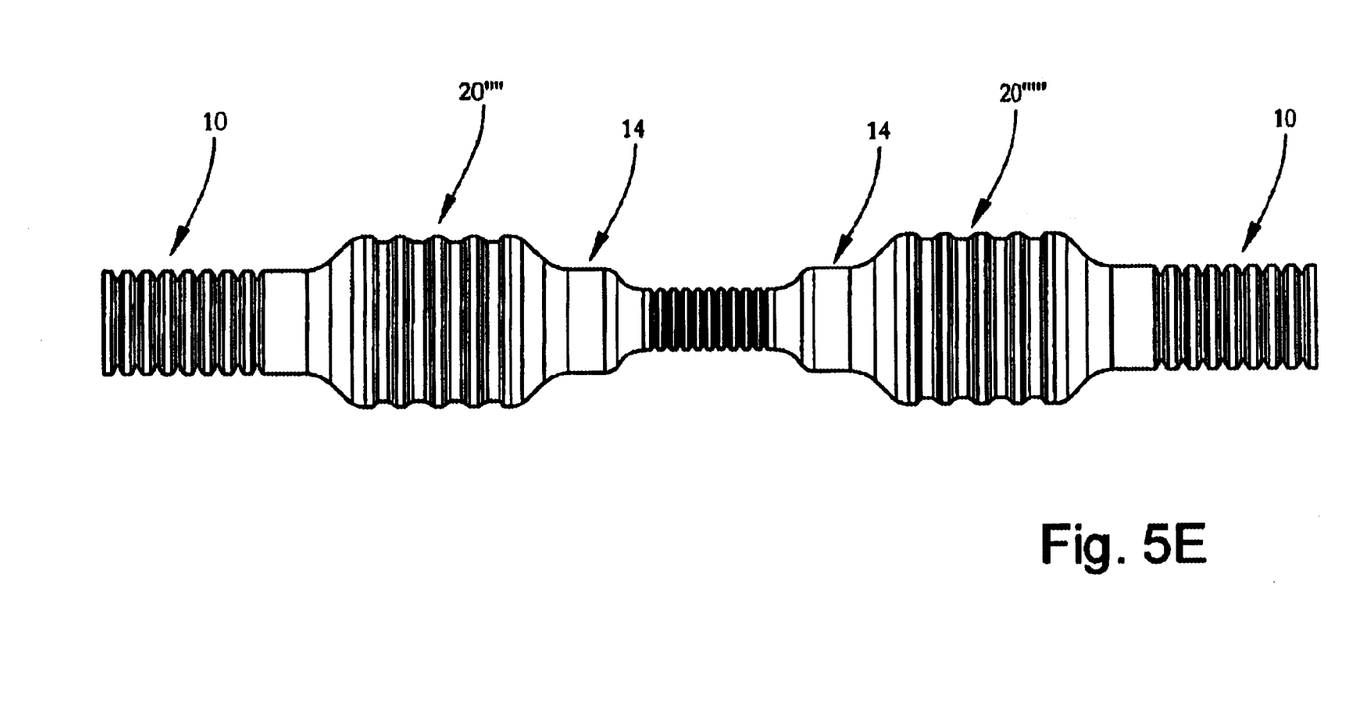
FIG. 5e is a side elevational view of yet another embodiment in accordance with the invention.

FIG. 5e illustrates yet another embodiment with the features according to the invention, wherein the transition section 14 includes a restriction of a cross-section smaller than a cross-section of the corrugated pipe section 10.

What is claimed is:

1. A plastic pipe configured to allow fluids to pass therethrough, the plastic pipe comprising a corrugated pipe section and a container section, the container section having first and second openings wherein the first opening is in fluid communication with the corrugated pipe section and wherein the first and second openings allow fluids to pass through the container section, the container section being monolithically or integrally formed with the corrugated pipe section such that the corrugated pipe and container sections are configured as a one-piece plastic pipe without abutment or sealing surfaces between the container section and the corrugated pipe section, the corrugated pipe section having corrugation peaks and corrugation valleys, the container section having a shape different from the shape of the corrugated pipe section wherein the container section has an outer diameter that is larger than the outer diameter of the corrugated pipe section and a wall thickness that is greater than or equal to the wall thickness of the corrugated pipe section.

2. The plastic pipe according to claim 1 further comprising a monolithically or integrally co-formed transition section of plastic between the container section and the corrugated pipe section for transitioning the cross-section of the corrugated pipe section into the cross-section of the container section.

3. The plastic pipe according to claim 1 wherein the container section at least in part is provided with a rigid wall.

4. The plastic pipe according to claim 1 wherein the container section is constructed at least partially as a structure selected from the group of a bellows, a corrugated pipe and a flexible container.

5. The plastic pipe according to claim 1 wherein the transition section includes a restriction of a cross-section smaller than a cross-section of the corrugated pipe section.

6. The plastic pipe according to claim 2 wherein the transition section has an interior sealing surface for engagement with a sealing disk.

7. The plastic pipe according to claim 1 wherein the container section further comprises at least one groove-shaped structure adjacent the second opening for receiving a sealing device.

8. The plastic pipe according to claim 7 wherein the sealing device comprises an O-ring.

9. The plastic pipe according to claim 1 wherein the container section further comprises at least one locking section at the second opening.

10. The plastic pipe according to claim 9 wherein the locking section comprises a locking lug or locking catch.

11. The plastic pipe according to claim 1 wherein the container section has adjacent to the second opening one of a union portion and a flange portion.

12. The plastic pipe according to claim 1 further comprising another corrugated pipe section in fluid communication with the second opening of the container section such that the container section is positioned between the corrugated pipe sections.

13. The plastic pipe according to claim 12 wherein the corrugated pipe section on one side of the container section differs from the corrugated pipe section on the other side of the container section in at least one parameter selected from the group of cross-sectional shape, corrugation shape and wall thickness.

14. The plastic pipe according to claim 1 wherein the container section includes several sections which differ in at least one parameter selected from the group of cross-sectional shape, corrugation shape and wall thickness.

15. The plastic pipe according to claim 1 further comprising several container sections.

16. The plastic pipe according to claim 15 wherein the container sections differ in at least one parameter selected from the group of cross-sectional shape, length and wall thickness.

17. The plastic pipe according to claim 12 wherein the corrugated pipe sections on both sides of the container section have the same cross-sectional shape, corrugation shape and wall thickness.

18. The plastic pipe according to claim 12 wherein at least one of the container sections and at least one of the corrugated pipe sections includes a threaded connecting section.

19. Corrugated plastic pipe with corrugation peaks and corrugation valleys, comprising a container monolithically formed and provided with the corrugation pipe in one piece, with no abutment or sealing surfaces between the container and the corrugated plastic pipe, and having a shape deviating from the shape of the corrugated plastic pipe, whereby a corrugated pipe section is respectively formed on each side of the container, and wherein the container has a wall thickness that is greater than or equal to the wall thickness of the corrugated plastic pipe.

20. Corrugated plastic pipe according to claim 19, whereby a transition section monolithically or integrally co-molded of plastic is provided between the container and the corrugated pipe for transitioning the corrugated pipe cross-section into the container cross-section.

21. The plastic pipe according to claim 1 further comprising at least one connecting portion to fluidly connect the plastic pipe to an apparatus or machine.

* * * * *

UNITED STATES PATENT AND TRADEMARK OFFICE
CERTIFICATE OF CORRECTION

PATENT NO. : 7,069,953 B2 Page 1 of 1
APPLICATION NO. : 10/216485
DATED : July 4, 2006
INVENTOR(S) : Büttner et al.

It is certified that error appears in the above-identified patent and that said Letters Patent is hereby corrected as shown below:

On the front page, Item (73) that portion of Assignee's name reading "Frankische" should read -- Fränkische --.

In column 5, line 9, the second occurrence of " 20″″ " should be changed to -- 20″″′--.

Signed and Sealed this

Twenty-seventh Day of February, 2007

JON W. DUDAS
*Director of the United States Patent and Trademark Office*